(12) United States Patent
Suzuki (10) Patent No.: US 12,140,894 B2
(45) Date of Patent: Nov. 12, 2024

(54) IMAGE FORMING DEVICE

(71) Applicant: KYOCERA Document Solutions Inc., Osaka (JP)

(72) Inventor: Atsushi Suzuki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 111 days.

(21) Appl. No.: 18/125,832

(22) Filed: Mar. 24, 2023

(65) Prior Publication Data

US 2023/0314995 A1 Oct. 5, 2023

(30) Foreign Application Priority Data

Mar. 29, 2022 (JP) ................................. 2022-052901

(51) Int. Cl.
*G03G 15/00* (2006.01)
(52) U.S. Cl.
CPC ..... *G03G 15/5004* (2013.01); *G03G 15/5012* (2013.01)
(58) Field of Classification Search
None
See application file for complete search history.

(56) References Cited

U.S. PATENT DOCUMENTS

| | | | | |
|---|---|---|---|---|
| 2012/0140355 A1* | 6/2012 | Carter | .................... | G11B 19/02 360/75 |
| 2013/0042120 A1* | 2/2013 | Ono | ...................... | G06F 1/3225 713/300 |
| 2013/0135659 A1* | 5/2013 | Ebi | ......................... | G06K 15/02 358/1.14 |
| 2018/0069980 A1* | 3/2018 | Miyata | ................. | H04N 1/2104 |
| 2023/0335198 A1* | 10/2023 | Hebishima | ............. | G11C 16/10 |

FOREIGN PATENT DOCUMENTS

JP 2015-208909 11/2015

* cited by examiner

*Primary Examiner* — Sevan A Aydin
(74) *Attorney, Agent, or Firm* — LEX IP MEISTER, PLLC

(57) ABSTRACT

The history record unit, in the non-volatile storage device, records recovery history information showing a history of the recovery process. The suspension control unit, when the recovery process' frequency specified based on the recovery history information exceeds a first reference frequency, restricts execution of the specific suspension process which is in response to a satisfaction of the suspension condition. Further, the suspension control unit, when the recovery process' frequency specified based on the recovery history information is lower than a second reference frequency, which is lower than the first reference frequency, under a situation where the specific suspension process' execution is restricted, cancels the restricting of the specific suspension process' execution.

5 Claims, 6 Drawing Sheets

FIG. 6

IMAGE FORMING DEVICE

INCORPORATION BY REFERENCE

This application is based upon, and claims the benefit of priority from, corresponding Japanese Patent Application No. 2022-052901 filed in the Japan Patent Office on Mar. 29, 2022, the entire contents of which are incorporated herein by reference.

BACKGROUND

Field of the Invention

The present disclosure relates to an image forming device that suspends a specific device when a suspension condition is satisfied, and that starts the specific device when a process request is received.

Description of Related Art

An image forming device such as a printer or an MFP executes a power-saving control. In the power-saving control, a control unit executes a suspension process when a suspension condition is satisfied, and executes a recovery process when a recovery event should occur.

The suspension condition is, for example, a condition that a state in which the image forming device is not requested to process continues for a specific time period. The recovery event is, for example, that a process request is received from another device, or that a person is detected by a person-sensitive sensor.

The control unit, in the suspension process, suspends a multiplicity of target devices including an image forming unit and the like. Further, the control unit, in the recovery process, starts up the multiplicity of target devices.

The multiplicity of target devices, as the case may be, includes a non-volatile storage device such as a hard disk drive or a flash memory. In the image forming devices, some devices, such as hard disk drives or flash memory, have a restricted number of startups due to a lifetime constraint.

Meanwhile, it is known that the image forming device, when the number of times of the recovery process exceeds a reference number of times, restricts the frequency of the recovery process. The reference number of times is set according to the operation time of the image forming device provided with the hard disk drive.

SUMMARY

An image forming device according to an aspect of the present disclosure includes: a communication device capable of communicating with another device; and a non-volatile storage device. Further, the image forming device includes: a suspension control unit; a recovery control unit; and a history record unit. The suspension control unit, when a specific suspension condition is satisfied, executes a specific suspension process to stop a power supply to a specific device. The recovery control unit, when a process request requiring the specific device is received via the communication device under a situation where the power supply to the specific device is stopped, executes a recovery process to supply power to the specific device. The history record unit, in the non-volatile storage device, records recovery history information showing a history of the recovery process. The suspension control unit, when the recovery process' frequency specified based on the recovery history information exceeds a first reference frequency, restricts execution of the specific suspension process which is in response to a satisfaction of the suspension condition. Further, the suspension control unit, when the recovery process' frequency specified based on the recovery history information is lower than a second reference frequency, which is lower than the first reference frequency, under a situation where the specific suspension process' execution is restricted, cancels the restricting of the specific suspension process' execution.

DETAILED DESCRIPTION

A description will hereinafter be made on an embodiment of the present disclosure with reference to the drawings. It should be noted that the following embodiment is an example embodying the present disclosure, and does not limit the technical scope of the present disclosure.

First Embodiment: Configuration of Image Forming Device 10

An image forming device 10 according to a first embodiment is provided with a print device 1 that executes a print process. The print process is a process of forming an image on a sheet 91.

Further, the image forming device 10 is also provided with an image reading device 2 that executes an image reading process to read an image from a document 92. For example, the image forming device 10 is a copier or a multifunction machine which has a copying function and a facsimile communication device's function.

The image forming device 10, through a network 90 such as a LAN (local Area Network), can communicate with another device such as a host device 9. For example, the network 90 is connected to the Internet. The host device 9 is an information process device that can communicate with the image forming device 10.

Figure 1:
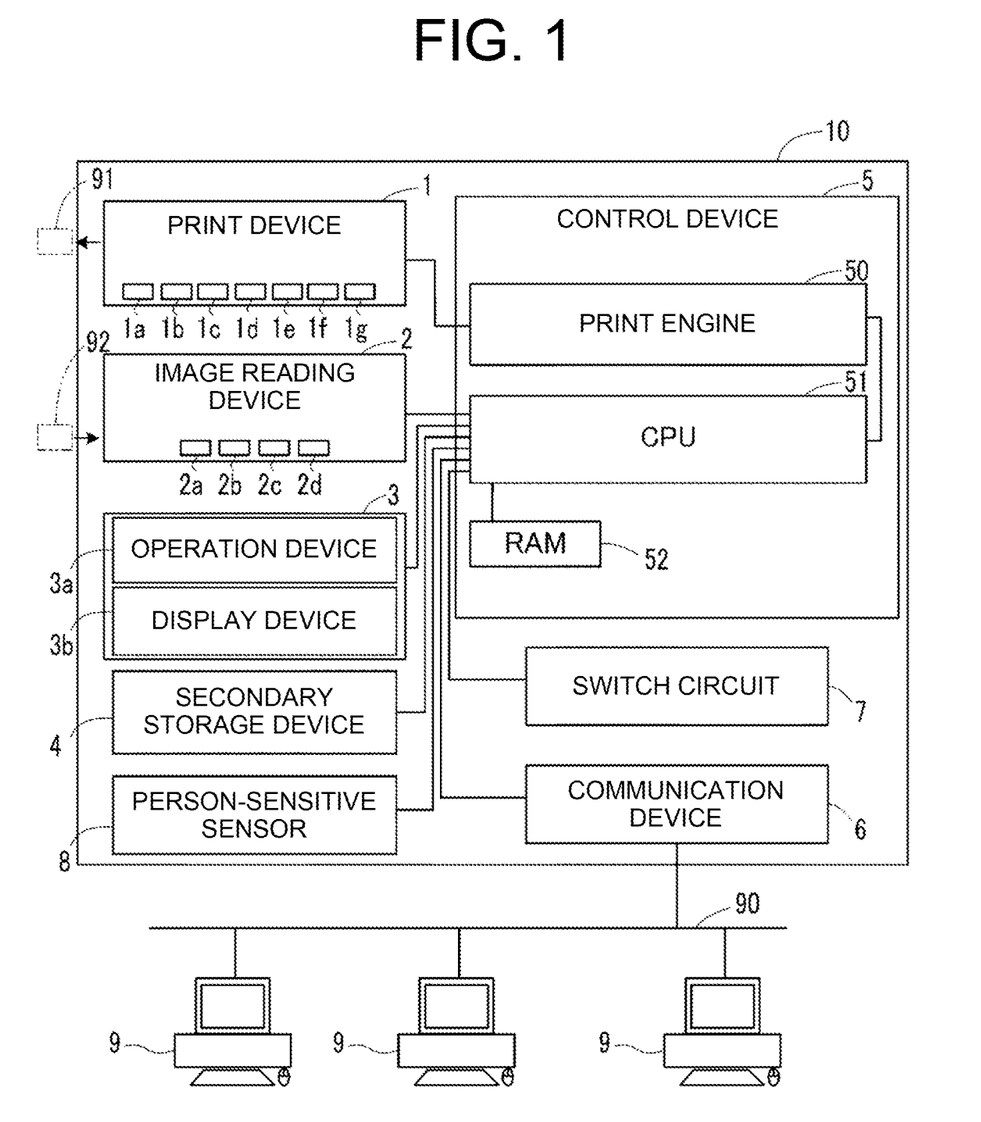
FIG. 1 is a block diagram showing a configuration of an image forming device according to a first embodiment.

As shown in FIG. 1, the image forming device 10 is provided with the image reading device 2, the print device 1, a user interface unit 3, a secondary storage device 4, a control device 5, a communication device 6, a switch circuit 7, a person-sensitive sensor 8, and the like.

The user interface unit 3 is a user interface that includes an operation device 3a and a display device 3b. The operation device 3a is a device that receives an operation of a user, and includes, for example, a recovery button and a touch screen. The display device 3b includes a display panel, such as a liquid crystal panel, capable of displaying information.

The communication device 6 is a communication interface device which, through the network 90, can execute a communication with another device such as the host device 9. Through the communication device 6, the control device 5 executes all of data sending and receiving operations to and from the other device.

The secondary storage device 4 is a computer-readable nonvolatile storage device. The secondary storage device 4 can store a program and various types of data. For example, one of a hard disk drive and an SSD (Solid State Drive), or a combination of both is employed as the secondary storage device 4.

The image reading device 2 executes a reading process to read an image of the document 92. The image reading device 2 is provided with a light source 2a, a scan mechanism 2b, an image sensor 2c, an AFE (Analog Front End) 2d, and the like.

The light source 2a emits a light to the document 92. The scan mechanism 2b scans the document 92 with the light from the light source 2a. The image sensor 2c receives a reflected light from the document 92, and outputs a detected signal of a received light amount as an image signal.

The AFE 2d converts the image signal into digital image data. In the description below, the image read from the document 92 by the image reading process of the image reading device 2 is referred to as a read image.

The print device 1 is a device that executes the print process to form the image on the sheet 91 by a specific method such as an electrophotographic method or an ink jet method.

In the present embodiment, the print device 1 is capable of executing the print process based on the data of the read image or based on the print data received from the host device 9 through the communication device 6. The print data is data that shows an image which is an object of the print process.

For example, when the print device 1 is a device that executes the print process using the electrophotographic method, the print device 1 is provided with a sheet conveyance mechanism 1a, a photoreceptor 1b, a charge device 1c, a laser scanning unit 1d, a developing device 1e, a transfer device 1f, a fixing device 1g, and the like.

The sheet conveyance mechanism 1a conveys the sheet 91 along a specific path. The charge device 1c electrically charges a surface of the photoreceptor 1b. The laser scanning unit 1d writes an electrostatic latent image on the surface of the charged photoreceptor 1b.

Into a toner image, the developing device 1e develops the electrostatic latent image on the photoreceptor 1b. The photoreceptor 1b is an image carrier that carries and rotates the toner image.

To the sheet 91, the transfer device 1f transfers the toner image on the photoreceptor 1b. The fixing device 1g heats the toner image on the sheet 91, thereby to fix the toner image to the sheet 91.

The person-sensitive sensor 8 is a sensor that detects a person present in front of the image forming device 10. For example, the person-sensitive sensor 8 may be an infrared ray sensor, an ultrasonic sensor, or the like.

The control device 5 executes various calculations, a data process, and control of various electronic devices included in the image forming device 10. The control device 5 can send and receive data and a control signal to and from the image reading device 2, the print device 1, the user interface unit 3, and the communication device 6.

The control device 5 includes a print engine 50, a CPU 51, a RAM (Random Access Memory) 52, and the like. The print engine 50 controls the print device 1 according to a command from the CPU 51, thereby to cause the print device 1 to execute the print process.

The print engine 50 is realized by a processor such as an MPU (Micro Processing Unit) or a DSP (Digital Signal Processor), or a circuit such as an ASIC (Application Specific Integrated Circuit).

The CPU 51 is a processor that executes the computer program, which is stored in the secondary storage device 4, thereby to execute various data processes and controls. Also, it is conceivable that, in place of the CPU 51, any other processor such as the DSP can execute the data processes and the controls.

The RAM 52 is a volatile storage device that primarily stores the program executed by the CPU 51, and the data that is output and referenced by the CPU 51 in the process of executing the program.

The switch circuit 7 is a circuit that, according to a switch control signal output from the CPU 51, switches, from one of an energization state and a shutdown state to the other thereof, the power supply lines to a multiplicity of specific target devices.

In the present embodiment, the multiple target devices include the print device 1, the image reading device 2, the display device 3b, the secondary storage device 4 and the print engine 50.

The CPU 51 executes the program thereby to operate as a multiplicity of process modules. The multiplicity of process modules includes a main control unit 5a, a secondary control unit 5b, a history management unit 5c, and the like (see FIG. 2).

Figure 2:
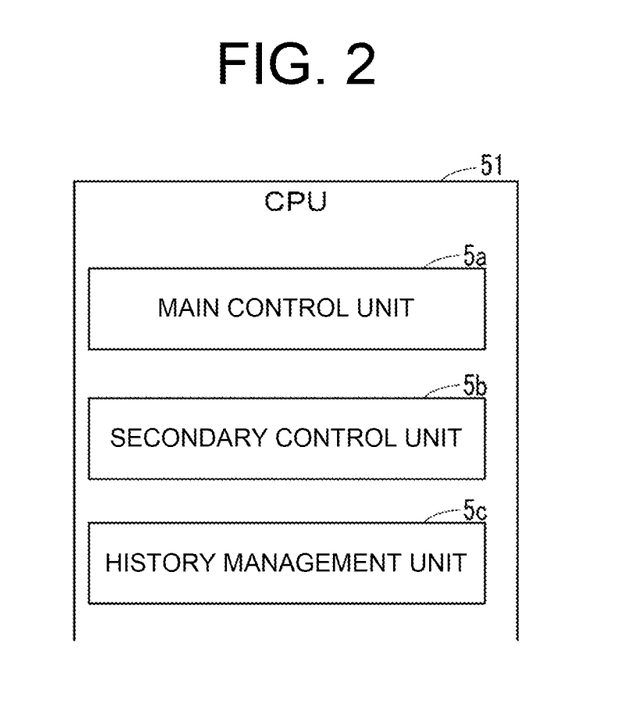
FIG. 2 is a block diagram showing a configuration of a multiplicity of process modules in a CPU of the image forming device according to the first embodiment.

The main control unit 5a controls the display device 3b, thereby to cause the display device 3b to display various information. Further, the main control unit 5a determines the content of a process request input through the operation device 3a or the communication device 6, and executes a process that accords to the content of the process request.

Further, the main control unit 5a controls the print engine 50, the image reading device 2, and the like.

For example, when the communication device 6 receives, from the host device 9, a print request command and print job data which includes the print data, the main control unit 5a outputs a reception print command to the print engine 50.

When receiving the reception print command from the main control unit 5a, the print engine 50 causes the print device 1 to execute the print process which is based on the print data.

Further, the main control unit 5a, when a specific suspension condition is satisfied, executes a suspension process. The suspension process is a process that controls the switch circuit 7, thereby to stop the power supply to the multiplicity of target devices.

By the main control unit 5a executing the suspension process, the image forming device 10 moves from a normal state to a suspension state. The normal state is a state in which power is supplied from a power circuit (not shown) through the switch circuit 7 to the multiplicity of target devices. The suspension state is a state in which power consumption is lower than in the normal state.

The image forming device 10, when being in the normal state, is capable of executing the image process such as the print process or the reading process. Meanwhile, the image forming device 10, when being in the suspension state, can receive data through the communication device 6, but cannot execute the image process.

Further, the main control unit 5*a*, in the suspension process, moves the CPU 51 to a sleep mode which consumes less power than a normal mode. For example, the CPU 51, in the sleep mode, operates with a frequency clock lower than in the normal mode.

The CPU 51, in any of the normal mode and the sleep mode, can execute the process of receiving data through the communication device 6 and the control of the switch circuit 7.

The suspension condition includes a first suspension condition. The first suspension condition is a condition that a time condition is satisfied, a no-process condition is satisfied, and the person-sensitive sensor 8 does not detect a person.

The time condition is a condition that a no-request state continues beyond a preset designated time. The no-request state is a state in which input of the process request through the operation device 3*a* or the communication device 6 is not executed.

The no-process condition is a condition that the process in response to the process request input through the operation device 3*a* or the communication device 6 is not left uncompleted.

Further, the suspension condition may include a second suspension condition. The second suspension condition is a condition that a specific suspension operation for the operation device 3*a* has been executed.

Further, the suspension condition may include a third suspension condition. The third suspension condition is a condition that the current time has entered a preset suspension time zone.

For example, it is conceivable that the suspension condition is a logical sum of the first, second, and third suspension conditions.

Meanwhile, the secondary control unit 5*b*, when a specific recovery event occurs under a situation where the image forming device 10 is in the suspension state, executes the recovery process. The recovery process is a process of supplying power to the multiplicity of target devices.

Further, the secondary control unit 5*b*, in the recovery process, moves the CPU 51 from the sleep mode to the normal mode. By the secondary control unit 5*b* executing the recovery process, the image forming device 10 moves from the suspension state to the normal state.

When, in the suspension state, the image forming device 10 is requested to execute the print process, the secondary control unit 5*b* first executes the recovery process, then, the main control unit 5*a* and the print engine 50 cause the print device 1 to execute the print process.

For example, the recovery events are some or all of first, second and third recovery events shown below.

The first recovery event is an event that the process request requiring some or all of the multiplicity of target devices has been received from the host device 9 through the communication device 6.

The second recovery event is an event that a specific recovery operation has been executed for the operation device 3*a*. The third recovery event is an event that the person-sensitive sensor 8 has detected a person.

The suspension process by the main control unit 5*a* and the recovery process by the secondary control unit 5*b* are each an example of a power-saving control.

The history management unit 5*c*, when the image forming device 10 recovers from the suspension state to the normal state, executes a history management process described below (see FIG. 5). The history management process is to be described below.

By the way, the image forming device 10 can communicate with the host device 9 such as a personal computer. The host device 9, by a certain application program being installed, frequently sends the process request through the network 90 to the image forming device 10, as the case may be.

Further, the secondary storage device 4, when including a hard disk drive, a flash memory or the like, has a restriction on the number of startups due to a lifetime constraint.

The secondary control unit 5*b*, by the image forming device 10 frequently receiving the process request from the host device 9, frequently executes the recovery process, as the case may be. In this case, the secondary storage device 4, before the operation time of the image forming device 10 reaching a designed service life time, may prematurely reach the end of the service life.

When the secondary control unit 5*b* restricts the number of times of the recovery process, the image forming device 10's convenience for the user will be lost.

Meanwhile, in the image forming device 10, the CPU 51 executes a normal state control and a suspension state control which are described below (see FIGS. 3 and 5). With this, the image forming device 10, when the process request by the host device 9 is frequently received, can prevent the power-saving control from frequently starting up the secondary storage device 4 which has the restriction on the number of startups.

[Normal State Control]

Hereinafter, an example of a procedure of the normal state control is described with reference to a flowchart shown in FIG. 3.

The main control unit 5*a*, when the image forming device 10 is in the normal state, executes the normal state control.

In the description below, S101, S102, . . . show identification signs of multiple steps in the normal state control. In the normal state control, step S101 is first executed.

<Step S101>

In step S101, the main control unit 5*a* determines whether or not the image forming device 10 has recovered from the suspension state to the normal state.

The main control unit 5*a*, when determining that the image forming device 10 has recovered from the suspension state to the normal state, moves the process to step S102.

Meanwhile, the main control unit 5*a*, when determining that the image forming device 10 has not recovered from the suspension state, moves the process to step S103. For example, the main control unit 5*a*, when the image forming device 10 is in a startup state due to a factor such as power ON, determines that the image forming device 10 has not recovered from the suspension state.

<Step S102>

Figure 5:
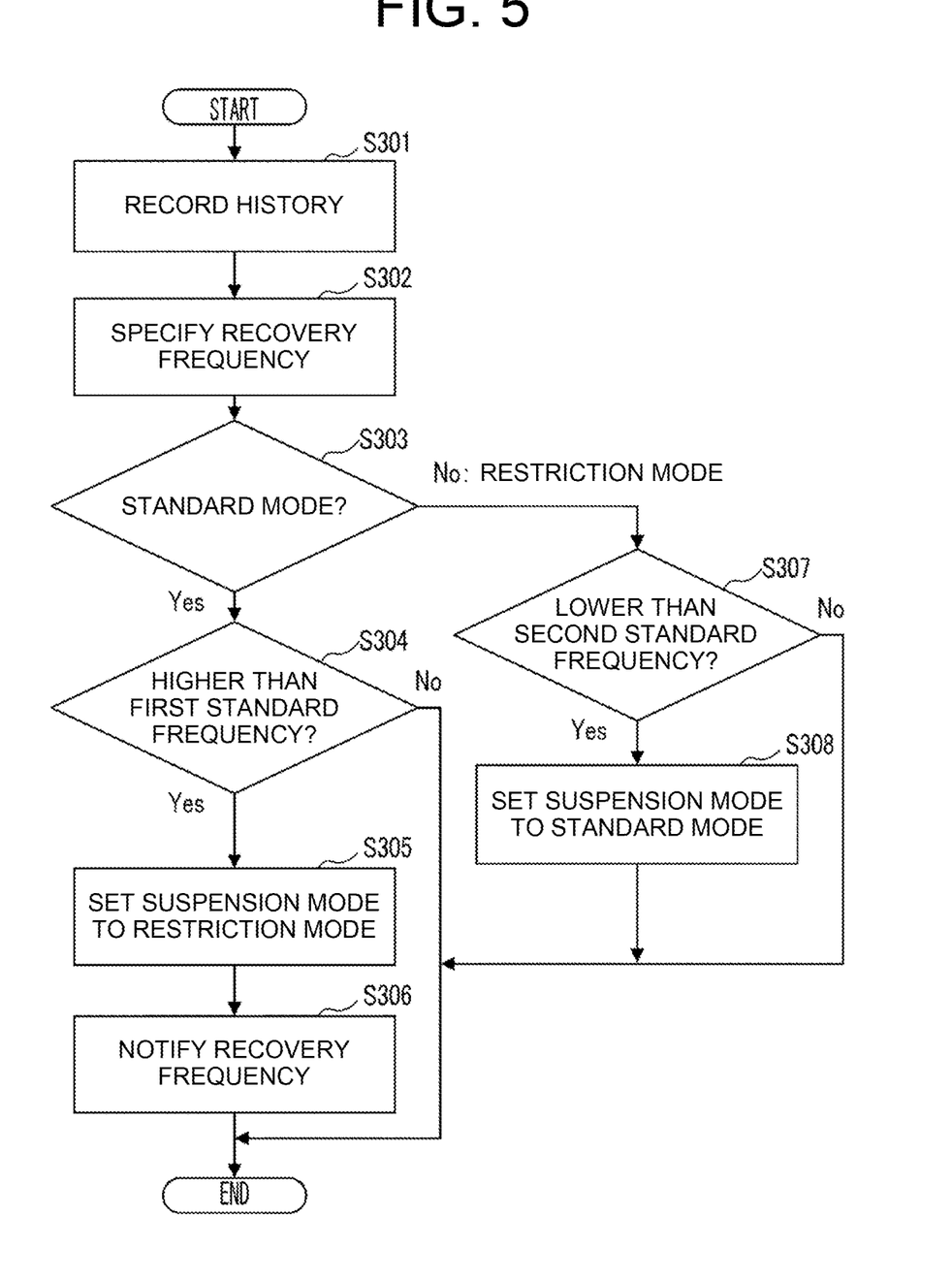
FIG. 5 is a flowchart showing an example of a procedure of a history management process in the image forming device according to the first embodiment.

In step S102, the history management unit 5*c* executes the history management process (see FIG. 5). The history management process is a process to manage the history of the execution of the recovery process. An example of the history management process is described below.

The history management unit 5*c*, after executing the process in step S102, moves the process to step S103.

<Step S103>

In step S103, the main control unit 5*a* checks the state of the communication device 6, and, when a process request of the host device 9 is received by the communication device 6, moves the process to step S104.

Meanwhile, the main control unit 5*a*, when the process request of the host device 9 is not received by the communication device 6, moves the process to step S105.

<Step S104>

In step S104, the main control unit 5a executes a reception response process. The main control unit 5a, in the reception response process, executes a process that responds to the process request received through the communication device 6.

For example, when the process request is a print request, the main control unit 5a causes the print device 1 to execute the print process through the print engine 50. In this case, the print device 1 executes the print process which is based on the print data received following the print request.

When the process request is a data save request, the main control unit 5a, in the secondary storage device 4, saves to-be-saved data received following the process request.

The main control unit 5a, after executing the reception response process, moves the process to step S103.

<Step S105>

In step S105, the main control unit 5a determines whether or not the suspension condition is satisfied. The main control unit 5a, when determining that the suspension condition is satisfied, moves the process to step S106. Meanwhile, the main control unit 5a, when determining that the suspension condition is not satisfied, moves the process to step S108.

<Step S106>

In step S106, the main control unit 5a, depending on whether the suspension mode is set to a reference mode or a restriction mode, controls where to move the process.

The suspension mode is information that specifies whether or not the image forming device 10 is in a state that restricts the movement from the normal state to the suspension state. The initial setting of the suspension mode is the reference mode. As described below, the history management process includes the process of changing the suspension mode (see FIG. 5).

The main control unit 5a, when the suspension mode is set to the reference mode, moves the process to step S107. Meanwhile, the main control unit 5a, when the suspension mode is set to the restriction mode, moves the process to step S108.

<Step S107>

In step S107, the main control unit 5a executes the suspension process. This stops the power supply to the multiplicity of target devices, and the image forming device 10 moves from the normal state to the suspension state.

The main control unit 5a, after executing the process in step S107, ends the normal state control.

Further, the suspension process in step S107 includes a specific suspension process to stop the power supply to the secondary storage device 4. The secondary storage device 4 is an example of a specific device. The suspension process is executed when the specific suspension condition is satisfied (see step S105). The main control unit 5a for executing the process in steps S107 is an example of a suspension control unit.

<Step S108>

In step S108, the main control unit 5a checks the state of the operation device 3a, and, when the process request's operation is detected at the operation device 3a, moves the process to step S109.

Meanwhile, the main control unit 5a, when the process request's operation is not detected at the operation device 3a, moves the process to step S103.

<Step S109>

In step S109, the main control unit 5a executes the operation response process. The main control unit 5a, in the operation response process, executes a process that responds to the process request's operation detected by the operation device 3a.

For example, the main control unit 5a, when a copy operation is detected at the operation device 3a, causes the image reading device 2 to execute the reading process and causes the print device 1 to execute the print process through the print engine 50. At that time, the main control unit 5a causes the print device 1 to execute the print process which is based on the data of the read image.

The main control unit 5a, when a stored data output operation is detected at the operation device 3a, causes the print device 1 to execute the print process through the print engine 50. At that time, the main control unit 5a causes the print device 1 to execute the print process which is based on the image data stored in the secondary storage device 4.

When a screen switch operation for the operation device 3a is detected, the main control unit 5a executes a process to switch the screen, which is to be displayed on the display device 3b, to a screen that responds to the screen switch operation.

The main control unit 5a, after executing the process in step S109, moves the process to step S103.

[Suspension State Control]

Figure 4:
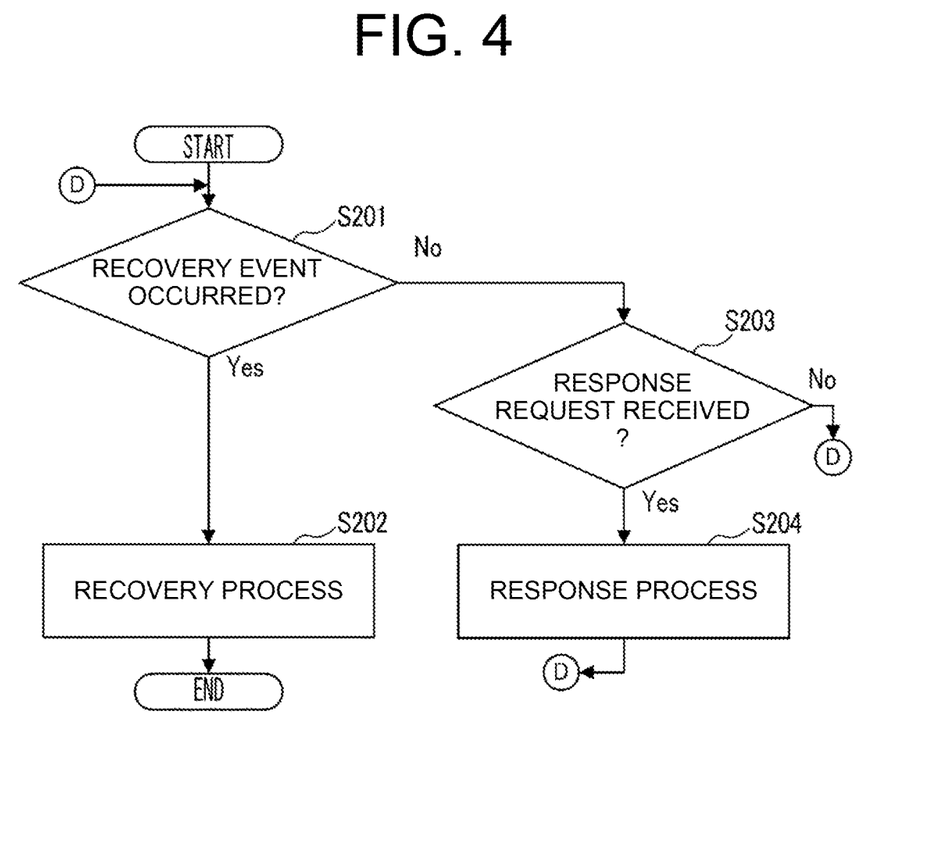
FIG. 4 is a flowchart showing an example of a procedure of a suspension state control in the image forming device according to the first embodiment.

Hereinafter, an example of a procedure of the suspension state control is described with reference to a flowchart shown in FIG. 4.

The secondary control unit 5b, when the image forming device 10 is in the suspension state, executes the suspension state control. That is, the suspension state control is executed under a situation that the power supply to the multiplicity of target devices including the secondary storage device 4 is stopped.

In the description below, S201, S202, . . . show identification signs of multiple steps in the normal state control. In the suspension state control, the process in step S201 is first executed.

<Step S201>

In step S201, the secondary control unit 5b executes a process to check whether or not the recovery event has occurred. For example, the recovery event is the first recovery event, the second recovery event or the third recovery event.

The secondary control unit 5b, when the recovery event has occurred, moves the process to step S202. Meanwhile, the secondary control unit 5b, when the recovery event has not occurred, moves the process to step S203.

<Step S202>

In step S202, the secondary control unit 5b executes the recovery process. As a result, the image forming device 10 recovers from the suspension state to the normal state.

For example, when receiving, from the host device 9 through the communication device 6, the process request requiring the secondary storage device 4, the secondary control unit 5b executes the recovery process. Further, the secondary control unit 5b that executes the processes of step S202 is an example of the recovery control unit.

The secondary control unit 5b, after executing the process in step S202, ends the suspension state control.

<Step S203>

In step S203, the secondary control unit 5b checks the state of the communication device 6, and, when a response request is received through the communication device 6, moves the process to step S204.

The response request is a process for responding to in what state the image forming device 10 is. The response process is an example of a request that does not require the multiple target devices.

The secondary control unit 5b, after executing the process in step S203, moves the process to step S204.

<Step S204>

In step S204, the secondary control unit 5b executes the response process that responds to the response request. In the response process; to a sender of the response request, the secondary control unit 5b sends information showing the state of the image forming device 10.

The secondary control unit 5b, after executing the process in step S204, moves the process to step S201.

[History Management Process]

Hereinafter, an example of a procedure of the history management process is described with reference to a flowchart shown in FIG. 5.

As described above, the history management unit 5c executes the history management process in step S102 in the normal state control.

In the description below, S301, S302, . . . show identification signs of multiple steps in the history management process. In the history management process, step S301 is first executed.

<Step S301>

In step S301, the history management unit 5c, in the secondary storage device 4, records the recovery history information showing the history of the recovery process.

For example, the recovery history information includes recover time information and recover factor information. The recovery time information is information showing the time when the image forming device 10 recovers to the normal state by the recovery process. The recover factor information is information showing the content of the recovery event that is a factor of the recovery process.

For example, when the recovery event that is the factor of the recovery process is the first recovery event, the recover factor information includes information on the sender of the process request and information on the content of the process request. The sender of the process request is the host device 9 that sent the process request.

The history management unit 5c, after executing the process in step S301, moves the process to step S302. Further, the history management unit 5c that executes the process in step S302 is an example of a history record unit.

<Step S302>

In step S302, the history management unit 5c specifies the recovery frequency based on the recovery history information. The recovery frequency is the frequency of the recovery process.

The history management unit 5c, after executing the process in step S302, moves the process to step S303.

<Step S303>

In step S303, the history management unit 5c controls the destination of the process movement according to the setting content of the suspension mode.

The history management unit 5c, when the suspension mode is set to the reference mode, moves the process to step S304. Meanwhile, the history management unit 5c, when the suspension mode is set to the restriction mode, moves the process to step S307.

As described above, the initial setting of the suspension mode is the reference mode.

<Step S304>

In step S304, the history management unit 5c determines whether or not the recovery frequency specified in step S301 is higher than a specific first reference frequency.

The first reference frequency is the upper limit frequency of startup of the secondary storage device 4 in a specific evaluation period. The first reference frequency is so preset that the estimated life of the secondary storage device 4 is longer than the design life of the image forming device 10.

The history management unit 5c, when determining that the recovery frequency is higher than the first reference frequency, moves the process to step S305. Meanwhile, the history management unit 5c, when determining that the recovery frequency is less than or equal to the first reference frequency, ends the history management process.

<Step S305>

In step S305, the history management unit 5c sets the suspension mode to the restriction mode. By the history management unit 5c setting the suspension mode to the restriction mode, the main control unit 5a restricts the suspension process' execution which is in response to the satisfaction of the suspension condition (see steps S105 to S107 in FIG. 3).

The history management unit 5c, after executing the process in step S305, moves the process to step S306.

<Step S306>

In step S306, the history management unit 5c executes a recovery frequency notification process. The recovery frequency notification process is a process to send, to a specific destination, notification information showing the frequency of the recovery process.

The notification information is information which is based on the recovery history information or the recovery history information. For example, the notification information is information showing the number of recoveries in the evaluation period for each type of recover factor information.

For example, the history management unit 5c, through the communication device 6 sends the notification information as an e-mail. The destination of the notification information is the device that responds to an administrator of the image forming device 10. For example, the destination of the notification information is one of the host devices 9 or a management server on the Internet.

Executing the recovery frequency notification process makes it possible for the administrator to grasp the factor that frequently causes the recovery process, and to take a measure to reduce the frequency of the recovery process.

The process in step S306 is executed when the suspension process' execution which is in response to the satisfaction of the suspension condition is restricted. The history management unit 5c that executes the process in step S306 is an example of a notification unit.

The history management unit 5c, after executing the process in step S306, ends the history management process.

<Step S307>

In step S307, the history management unit 5c determines whether or not the recovery frequency specified in step S301 is lower than a specific second reference frequency. The second reference frequency is lower than the first reference frequency.

The history management unit 5c, when determining that the recovery frequency is lower than the second reference frequency, moves the process to step S308. Meanwhile, the history management unit 5c, when determining that the recovery frequency is greater than or equal to the second reference frequency, ends the history management process.

<Step S308>

In step S308, the history management unit 5c sets the suspension mode to the reference mode. The history management unit 5c, after executing the process in step S308, ends the history management process.

Figure 3:
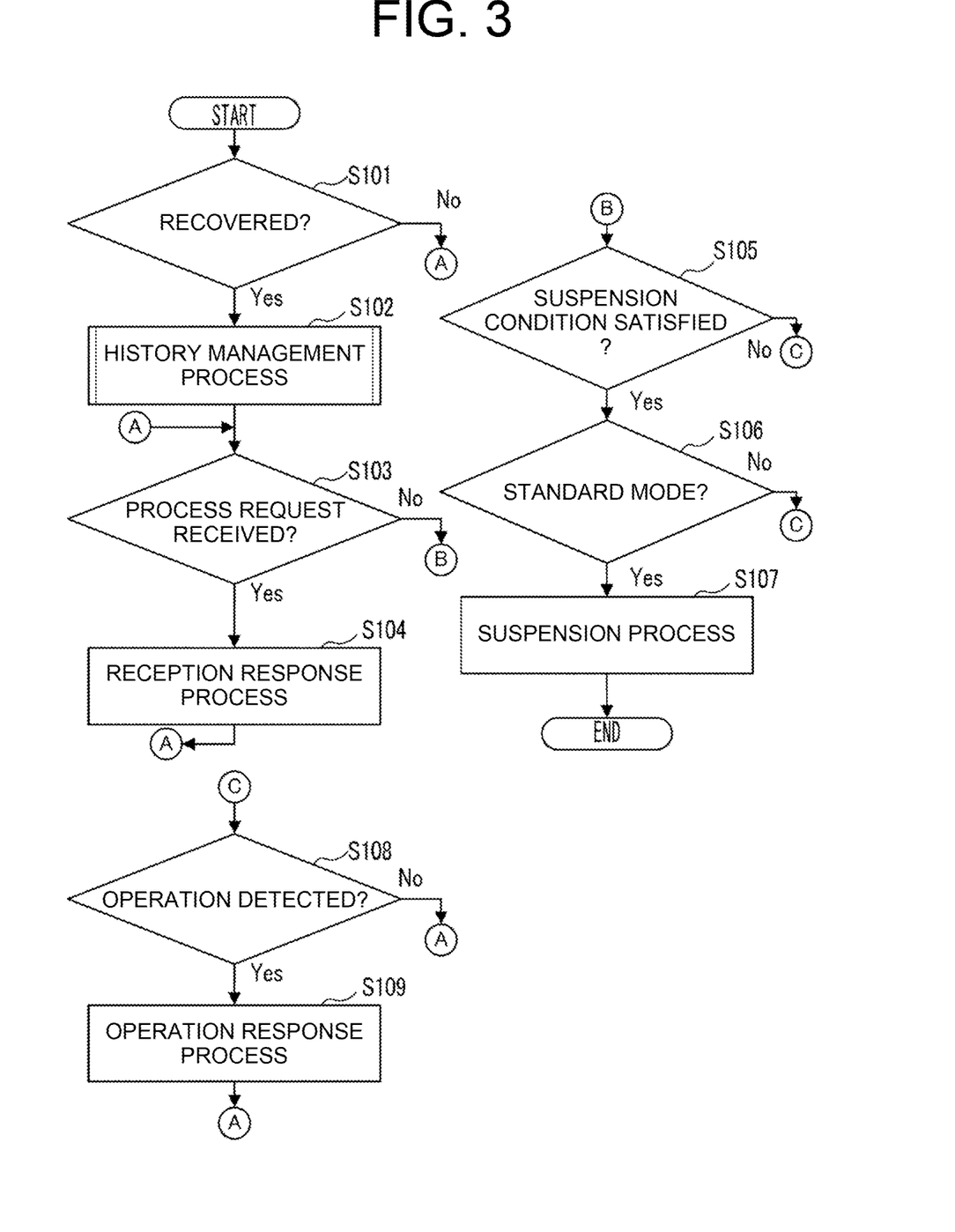
FIG. 3 is a flowchart showing an example of a procedure of a normal state control in the image forming device according to the first embodiment.

As shown above, the main control unit 5a, when the recovery frequency specified based on the recovery history information exceeds the first reference frequency, restricts the suspension process' execution which is in response to the satisfaction of the suspension condition (see steps S302 to S305 in FIG. 5 and steps S105 to S107 in FIG. 3).

Thus, the image forming device 10, when the process request by the host device 9 is frequently received, can prevent the power-saving control from frequently starting up the secondary storage device 4 which has the restriction on the number of startups.

Further, the main control unit 5a, when the recovery frequency is lower than the second reference frequency under the situation where the suspension process' execution is restricted, cancels the restricting of the execution of the suspension process (see steps S307 and S308 in FIG. 5 and steps S105 to S107 in FIG. 3).

Thus, it is possible to suppress the power consumption of the image forming device 10 while ensuring a sufficient life span of the secondary storage device 4.

Second Embodiment

Next, an image forming device according to a second embodiment will be described with reference to FIG. 6.

The image forming device according to the present embodiment has the same configuration as in the image forming device 10 shown in FIGS. 1, 2. In the present embodiment, the main control unit 5a executes the normal state control in the procedure shown in FIG. 6, for example.

The normal state control in the present embodiment is executed in the procedure shown in FIG. 3, in which step S106 is replaced with step S106a, and step S110 is added.

Figure 6:
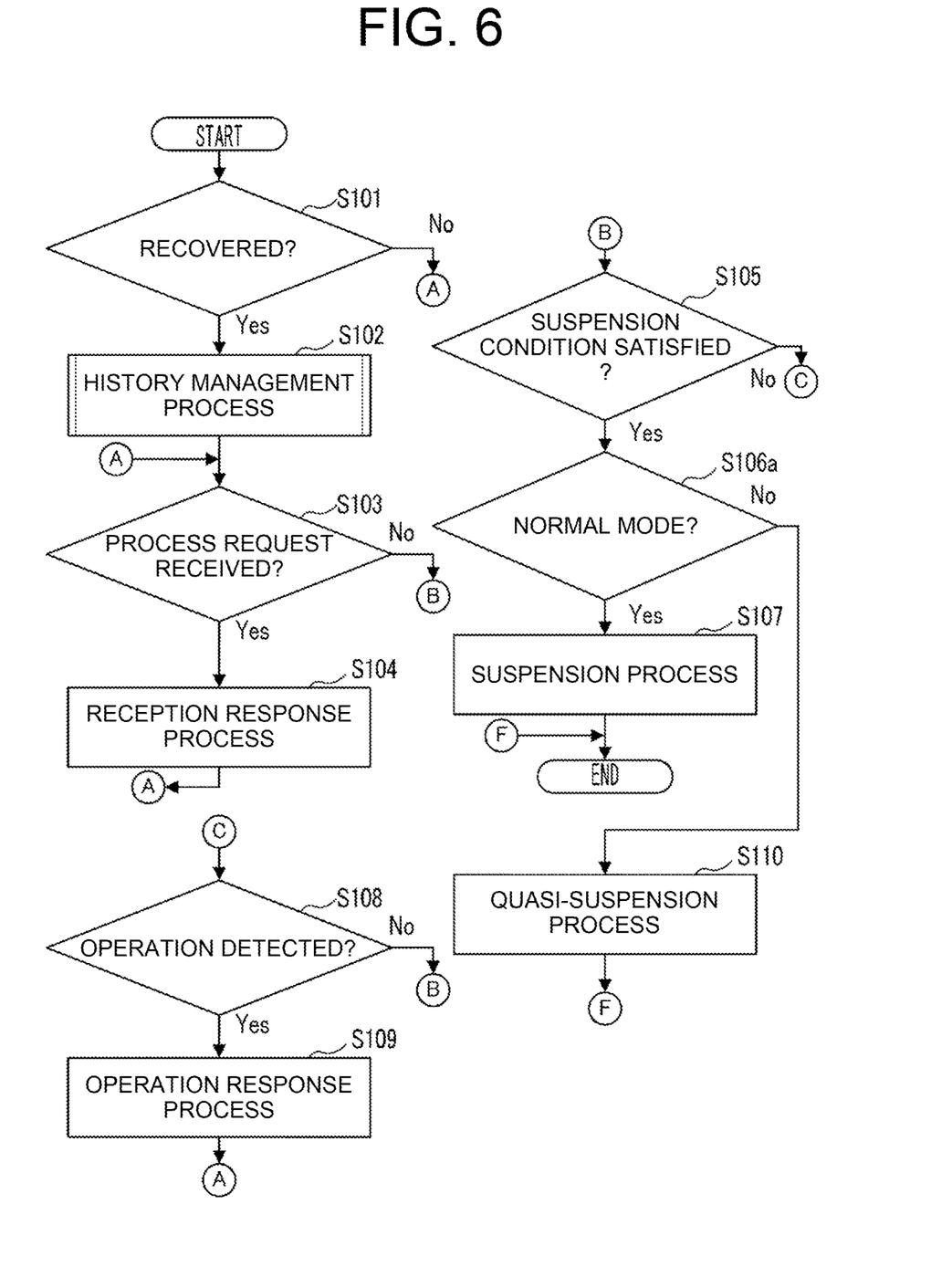
FIG. 6 is a flowchart showing an example of a procedure of the ordinary state control in the image forming device according to a second embodiment.

Steps S101 to S105 and S107 to S109 in FIG. 6 are the same as steps S101 to S105 and S107 to S109 in FIG. 3, respectively.

The following is a description of a point in which the normal state control shown in FIG. 6 is different from the normal state control shown in FIG. 3.

<Step S106a>

In step S106a, the main control unit 5a, depending on whether the suspension mode is set to the standard mode or the restriction mode, controls where to move the process.

The main control unit 5a, when the suspension mode is set to the reference mode, moves the process to step S107. Meanwhile, the main control unit 5a, when the suspension mode is set to the restriction mode, moves the process to step S110.

<Step S110>

In step S110, the main control unit 5a executes a quasi-suspension process. The quasi-suspension process is a process to stop the power supply to a remaining device excluding the secondary storage device 4 among the multiple target devices.

The main control unit 5a controls the switch circuit 7 thereby to execute the quasi-suspension process. The main control unit 5a, when executing the quasi-suspension process, maintains the power supply to the secondary storage device 4.

The main control unit 5a, after executing the process in step S110, ends the normal state control.

In the present embodiment, the main control unit 5a, when the suspension condition is satisfied, stops the power supply to the multiplicity of target devices including the secondary storage device 4 (see step S107). The process in step S107 includes the specific suspension process. The suspension process in step S107 in the present embodiment is an example of the first suspension process.

However, when the recovery frequency specified based on the recovery history information exceeds the first reference frequency, the main control unit 5a, if the suspension condition is satisfied, executes the quasi-suspension process instead of the suspension process (see step S110).

The quasi-suspension process in step S110 is an example of the second suspension process. The main control unit 5a executing the quasi-suspension process is an example of the restricting of the specific suspension process that stops the power supply to the secondary storage device 4.

In the case where the present embodiment is employed, the same effect as in the case where the first embodiment is employed is acquired. Further, when the present embodiment is employed, the power saving effect is greater than when the first embodiment is employed.

First Applied Example

The following is a description of a first applied example of the first or second embodiment.

In the present applied example, the main control unit 5a, in a preset specific time zone, executes the restricting of the suspension process in step S106 in FIG. 3 or S106a in FIG. 6.

The specific time zone is, for example, a standard work time zone in an office, or the like. Employing the present applied example brings about an effect same as when the first or second embodiment is employed.

Second Applied Example

The following is a description of a second applied example of the first or second embodiment.

In the present applied example, the history management unit 5c, in step S303 in FIG. 5, for example, specifies the recovery frequency, and further executes a condition change process. The condition change process is to change the suspension condition according to the recovery process' frequency which is specified based on the recovery history information.

The history management unit 5c which executes the condition change process is an example of a condition change unit.

In the present applied example, the history management unit 5c, when the recovery frequency exceeds the specific frequency, executes the condition change process. The specific frequency is lower than the first reference frequency and higher than the second reference frequency.

For example, the history management unit 5c, according to the recovery frequency, changes the designated time in the time condition of the first suspension condition. More specifically, it is conceivable that each time the recovery frequency exceeds one or more specific threshold frequencies, the history management unit 5c changes the designated time to a longer time.

It is expected that the history management unit 5c changing the suspension condition prevents the restricting of the recovery process.

What is claimed is:

1. An image forming device comprising:
   a communication device capable of communicating with another device;
   a non-volatile storage device;
   a suspension control unit that, when a specific suspension condition is satisfied, executes a specific suspension process to stop a power supply to a specific device;
   a recovery control unit that, when a process request requiring the specific device is received via the communication device under a situation where the power supply to the specific device is stopped, executes a recovery process to supply power to the specific device; and
   a history record unit that records, in the non-volatile storage device, recovery history information showing a history of the recovery process,
   wherein
   the suspension control unit, when the recovery process' frequency specified based on the recovery history information exceeds a first reference frequency, restricts the specific suspension process' execution which is in response to a satisfaction of the suspension condition, and
   the suspension control unit, when the recovery process' frequency specified based on the recovery history information is lower than a second reference frequency, which is lower than the first reference frequency, under a situation where the specific suspension process' execution is restricted, cancels the restricting of the specific suspension process' execution.

2. The image forming device according to claim 1, further comprising:
   a notification unit that, when the specific suspension process' execution in response to the satisfaction of the suspension condition is restricted, sends, through the communication device to a specific destination, the recovery history information or information which is based on the recovery history information.

3. The image forming device according to claim 1, wherein
   the specific device is the non-volatile storage device,
   the suspension control unit, when the suspension condition is satisfied, executes a first suspension process to stop the power supply to a multiplicity of target devices including the non-volatile storage device,
   the recovery control unit, in the recovery process, supplies the power to the multiplicity of target devices, and
   the suspension control unit, when the recovery process' frequency specified based on the recovery history information exceeds the first reference frequency, and if the suspension condition is satisfied, executes a second suspension process to stop the power supply to any remaining device excluding the non-volatile storage device among the multiple target devices.

4. The image forming device according to claim 1, wherein
   the suspension control unit, in a preset time zone, executes the restricting of the specific suspension process based on the recovery history information.

5. The image forming device according to claim 1, further comprising:
   a condition change unit that changes the suspension condition according to the recovery process' frequency which is specified based on the recovery history information.

\* \* \* \* \*